(12) United States Patent
Kim

(10) Patent No.: US 7,309,013 B2
(45) Date of Patent: Dec. 18, 2007

(54) TV AND CONTROL METHOD THEREOF

(75) Inventor: Chang-jin Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 151 days.

(21) Appl. No.: 11/062,872

(22) Filed: Feb. 23, 2005

(65) Prior Publication Data

US 2006/0000908 A1  Jan. 5, 2006

(30) Foreign Application Priority Data

Jul. 1, 2004  (KR) ................... 10-2004-0051222

(51) Int. Cl.
*G06K 7/08* (2006.01)
(52) U.S. Cl. ................... 235/451; 235/381
(58) Field of Classification Search ........... 235/451, 235/381, 382, 492; 725/91, 51, 23, 78; 340/5.52, 340/5.82
See application file for complete search history.

(56) References Cited

U.S. PATENT DOCUMENTS

| | | | | |
|---|---|---|---|---|
| 5,521,631 A * | 5/1996 | Budow et al. | ........... | 725/78 |
| 5,953,047 A * | 9/1999 | Nemirofsky | ........... | 725/23 |
| 6,594,727 B1 * | 7/2003 | Tanaka | ........... | 711/115 |
| 6,747,642 B1 * | 6/2004 | Yasumoto | ........... | 345/419 |
| 6,898,299 B1 * | 5/2005 | Brooks | ........... | 382/115 |
| 2001/0033734 A1 * | 10/2001 | Hoda et al. | ........... | 386/46 |
| 2003/0005445 A1 * | 1/2003 | Schein et al. | ........... | 725/51 |
| 2003/0037336 A1 * | 2/2003 | Leftwich | ........... | 725/91 |
| 2004/0031856 A1 * | 2/2004 | Atsmon et al. | ........... | 235/492 |
| 2004/0065731 A1 * | 4/2004 | Vesterling | ........... | 235/382 |

FOREIGN PATENT DOCUMENTS

| | | |
|---|---|---|
| JP | 2003-76949 A | 3/2003 |
| KR | 2000-0051331 A | 8/2000 |
| KR | 2001-0037219 A | 5/2001 |
| KR | 2003-0024057 A | 3/2003 |

* cited by examiner

*Primary Examiner*—Thien Minh Le
(74) *Attorney, Agent, or Firm*—Sughrue-Mion, Pllc.

(57) ABSTRACT

A TV includes a memory module including a mounting part detachably mounted with kinds of memory cards; an input part to receive an access command to access the memory card mounted thereon; and a signal processor operating data communication corresponding to the access command with the memory module after a predetermined delaying time is passed from an inputting moment of the access command when the access command is inputted through the input part. Thus the present invention provides a TV and control method thereof to stably access a memory card mounted on a multi-memory slot.

7 Claims, 2 Drawing Sheets

TV AND CONTROL METHOD THEREOF

CROSS-REFERENCE TO RELATED APPLICATIONS

This application claims the benefit of Korean Patent Application No. 2004-0051222, filed Jul. 1, 2004, in the Korean Intellectual Property Office, the disclosure of which is incorporated herein by reference.

BACKGROUND OF THE INVENTION

1. Field of the Invention

The present invention relates to a television ("TV") and control method thereof and, more particularly, to a TV and control method thereof providing a stable access method to access a memory module comprising a multi-memory slot.

2. Description of the Related Art

A memory card is employed for an auxiliary memory unit of an audio-video ("AV") apparatus such as a TV, a camcorder, a digital camera, a MP3 player, etc.

The memory card makes use of a data exchange data between AV apparatuses like a floppy disk. For example, after a user stores an image captured by the camcorder in the memory card, the user may mount the memory card in the TV and then play back the image on the TV. Also, the user may play back a picture and/or a sound, etc. on the TV after mounting the memory card, including a picture captured by the digital camera, a sound stored as an MP3 file, etc.

The TV comprises a playback engine, such as a decoder, etc., corresponding to a type of multimedia data. Also, the TV comprises a multi-memory slot corresponding to each type of the memory card so as to be capable of being mounted with various types of the memory cards such as a CFC (Compact Flash CARD), a SMC (Smart Media Card), a SD (Secure Digital Card), a MMC (Multi Media Card), a MS (Memory Stick), etc.

Accordingly, the user may selectively mount the memory card on a corresponding memory slot, and access stored data of the memory card by inputting a control command through an input device such as a remote control, etc.

Generally, the TV is programmed so that an operation for outputting of the image and/or the sound is repeatedly operated per frame unit with an infinite loop. An access control command by the user is employed for an interrupt signal interrupting the foregoing repeated operation. Through these operations, a program which was repeatedly operated becomes out of order by the interrupt signal, and the memory card may be not accessed. When the memory card is normally accessed, data communication may be also interrupted due to an error or a fault on communication.

However, a conventional TV doesn't solve the foregoing problem, and the foregoing problem may drop the trust in the user and confuse the user.

SUMMARY OF THE INVENTION

Accordingly, it is one aspect of the methods and apparatuses disclosed herein to stably access a memory card mounted on a multi-memory slot.

Additional aspects and/or advantages of these methods and apparatuses will be set forth in part in the description which follows and, in part, will be obvious from the description, or may be learned by practice of the invention.

The foregoing and/or other aspects of these methods and apparatuses are achieved by providing a TV comprising: a memory module, including a mounting part configured to accept a plurality of types of memory cards; an input part configured to receive an access command to access a memory card mounted on the memory module; and a signal processor configured to operate data communication corresponding to the access command with the memory module after a predetermined delaying time is passed, the predetermined delaying time starting when the access command is received by the input part.

Consistent with one exemplary embodiment, the TV further comprises a reset input part configured to generate a reset signal by operation of a user, and a power controller configured to temporarily cut off driving power of the memory module during a reset time, the reset time starting when the reset signal is generated.

Consistent with another embodiment, the access command comprises at least one of a checking command to check whether the memory card is mounted thereon, a searching command to search stored data of the memory card, a playback command to play back the stored data of the memory card mounted thereon and a storing command to store data in the memory card.

The foregoing and/or other aspects of these methods and apparatuses can be achieved by providing a TV comprising: a memory module, including a mounting part configured to accept a plurality of types of memory cards, and a power controller configured to temporarily cut off driving power of the memory module mounted with the memory card during a reset time, the reset time starting after a rest signal is input thereto.

The foregoing and/or other aspects of these methods and apparatuses can be achieved by providing a control method of a TV comprising a memory module having detachably mounted thereto a plurality of types of memory cards, and able to input and output stored data of the memory card, the control method comprising: inputting an access command to access a memory card; maintaining previous playback during a predetermined delaying time after the access command is input; and operating data communication corresponding to the access command with the memory module after the predetermined delaying time is passed.

Another embodiment of the control method disclosed herein further comprises determining whether a reset signal has been input to the TV, and cutting off driving power of the memory module during a reset time, the reset time starting when the reset signal is inputted thereto.

Consistent with yet another embodiment of the control method as disclosed herein, the control method further comprises resupplying the driving power to the memory module after the reset time is passed, and accessing the stored data of the memory card corresponding to the access command after a predetermined time is passed, the predetermined time starting when the driving power is resupplied to the memory module.

BRIEF DESCRIPTION OF THE DRAWINGS

These and other aspects and advantages of the methods and apparatuses disclosed herein will become apparent and more readily appreciated from the following description of the exemplary embodiments, taken in conjunction with the accompany drawings of which.

DETAILED DESCRIPTION OF EXEMPLARY, NON-LIMITING EMBODIMENTS

Figure 1:
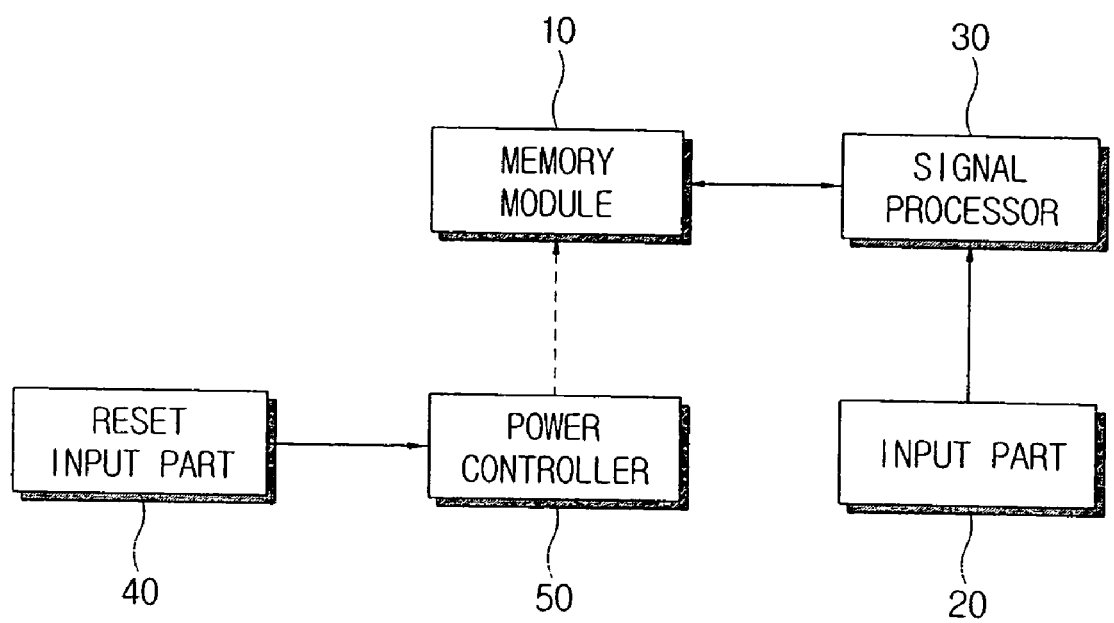
FIG. 1 is a schematic block diagram of a TV consistent with one embodiment of the apparatuses disclosed herein.

Reference will now be made in detail to the exemplary embodiments of the methods and apparatuses disclosed herein which are illustrated in the accompanying drawings, wherein like reference numerals refer to like elements throughout.

As shown in FIG. 1, a TV comprises a memory module 10, an input part 20 and a signal processor 30.

The memory module 10 comprises a mounting part (not shown) on which various types of memory cards, such as a CFC, a SMC, a SD, a MMC, a MS, etc., may be mounted. Also, the memory module 10 comprises a controller (not shown) to control input/output of stored data of the memory card mounted on the mounting part.

The input part 20 receives an access command from a user, and comprises a user operating device, such as a remote control, an input button of a control panel, a touch panel, etc., and a microcomputer processing a signal inputted from the user operating device.

Herein, the access command may comprise at least one operating command among checking of the memory card mounted on the memory module 10; searching, executing and playing back of the stored data in the memory card; and storing data.

The signal processor 30 operates data communication with the memory module 10 according to the access command inputted through the input part 20.

Herein, a protocol of the data communication is freely set on a system design. When the signal processor 30 and the memory module 10 are connected through a bus, the data communication comprises an access method according to a bus type. For example, a communication protocol is selected by a system designer considering that whether a line of inputting and outputting data is divided and what kind of a controlling signal (a strobe signal, an ack signal, etc.) is used.

Also, the signal processor 30 may comprise a signal receiver for receiving a broadcasting signal, a tuner to select a channel, a decoder corresponding to a data type and/or an A/V output device to output an audio/video signal, and may play back a plurality of kinds of multimedia data.

Figure 2:
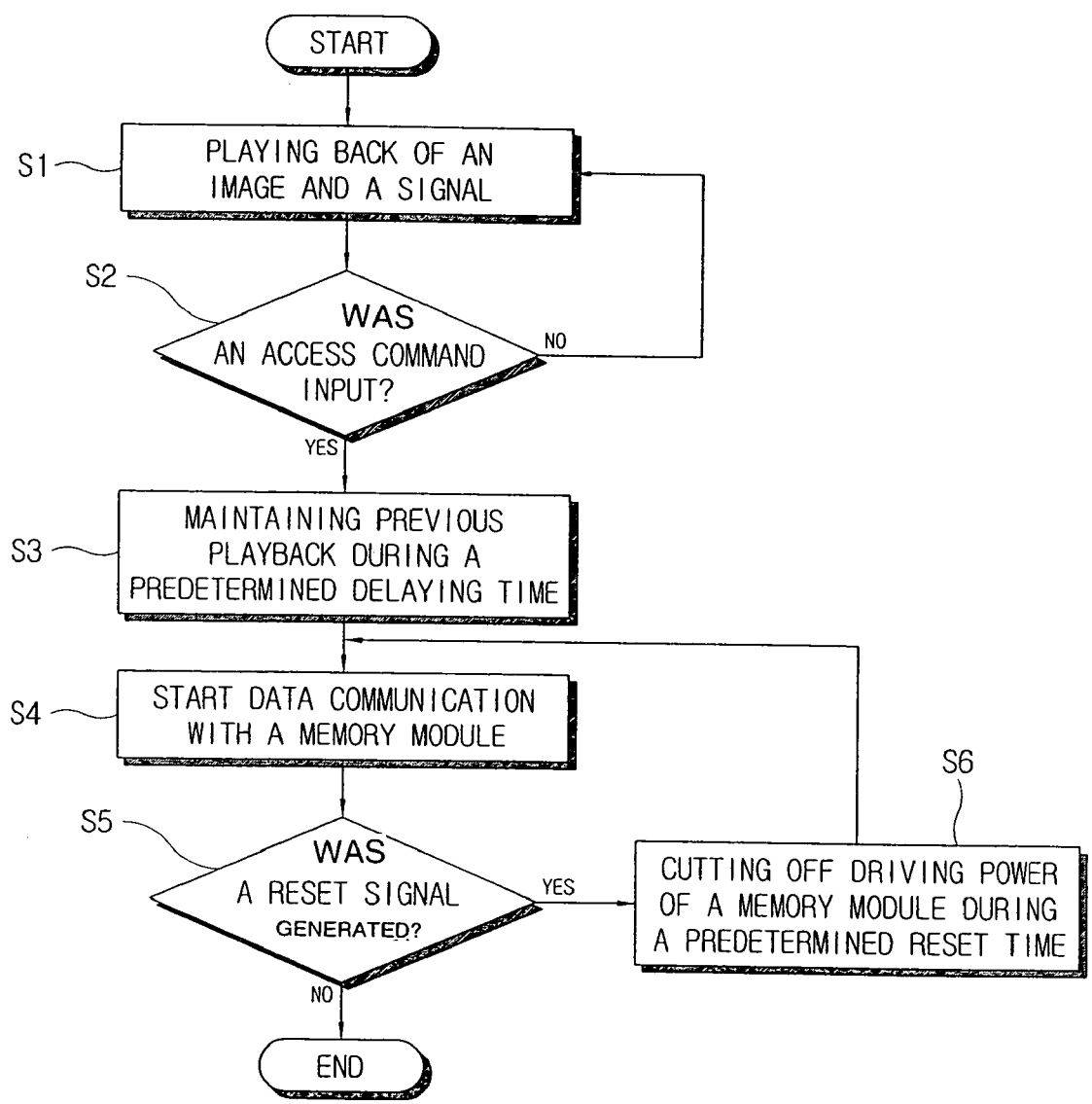
FIG. 2 is a control flow chart of a control method of a TV consistent with one embodiment of the methods disclosed herein.

FIG. 2 is a control flow chart illustrating of control method of a TV according to one exemplary embodiment of the methods disclosed herein.

Operation of the TV disclosed in FIG. 1 will be described referring to FIG. 2 as follows.

When the user turns on the TV, the signal processor 30 plays back the broadcasting signal through a preset channel at operation S1. The signal processor 30 may selectively play back an external input AV signal inputted from a video cassette player, a DVD player, a camcorder, etc. by operation of the user.

When the user inputs the access command to access the memory module 10 through the input part 20, the access command functions as an interrupt signal that is processed in the signal processor 30 at operation S2.

The signal processor 30 temporarily maintains previous playback during a predetermined delaying time from the moment of inputting of the access command at operation S3. After the delaying time is passed, the signal processor 30 starts to communicate data with the memory module 10 according to the access command at operation S4.

Herein, the data communication comprises transmitting and receiving of various data corresponding to the access command. For example, if the access command is a playback command to play back the stored data of the memory card, the data communication is for reading the data of the memory card. Meanwhile, if the access command is a checking command to check the memory card mounted on the memory module 10, the data communication is to check information of mounting of the memory card, kinds of the memory card mounted thereon and contents of the stored data.

In one embodiment, the TV does not instantly communicate the data with the memory module 10 when the access command to access memory module 10 is inputted from the input part 20, and the TV presets the delaying time alleviating over-operating of a system and the program so that the operating to access the memory module 10 becomes stably.

By referring to FIG. 1, the TV may further comprises a reset input part 40 and a power controller 50.

The reset input part 40 generates a reset signal by operation of the user and may comprise the same device as input part 20.

The power controller 50 supplies driving power to drive the memory module 10, and may comprise a power supply, a switching device to switch on/off supplying the driving power, a controller, etc.

As shown in FIG. 2, when the reset signal is generated from the reset input part 40 during the data communication between the signal processor 30 and the memory module 10 at operation S5, the power controller 50 cuts off the driving power of the memory module 10 during a predetermined reset time at operation S6.

When the driving power is resupplied to the memory module 10 from the power controller 50 after the predetermined reset time is passed, the signal processor 30 repeatedly communicates the data with the memory module 10 at operation S4.

Then, the signal processor 30 may start the data communication with the memory module 10 after a predetermined time is passed for stability of the system.

In one embodiment, when the operation of the TV is stopped, e.g., due to an error in the communication, etc., during the data communication with the memory module 10, the user resets only the memory module 10 without resetting the driving power of the entire TV system and then the data communication becomes in an initial state.

Meanwhile, a setting state of the TV is classified into a broadcasting mode, a cable mode, a video mode, a DVD mode, a memory card mode, etc. according to a source of image information. As described above, when the setting state of the TV is converted into the memory card mode, the memory card is accessed after a predetermined time is passed so that the data communication is stabilized.

If the TV displays a message informing that a mode is normally converting thereinto during the delaying time according to converting of the mode, the user may be prevented from being confused in using. Also, when the TV maintains playing back, or presets the sound in mute state if necessary, the user may be more comfortable.

Although several exemplary and non-limiting embodiments of the methods and apparatuses disclosed herein have been shown and described, it will be appreciated by those skilled in the art that changes may be made in these embodiments without departing from the principles and spirit of the invention, the scope of which is defined in the appended claims and their equivalents.

What is claimed is:

1. A TV comprising:
   a memory module, including a mounting part configured to accept a plurality of types of memory cards;

an input part configured to receive an access command to access a memory card mounted on the memory module; and a signal processor configured to operate data communication corresponding to the access command with the memory module after a predetermined delaying time is passed, the predetermined delaying time starting when the access command is received by the input part.

2. The TV according to claim 1, further comprising:

a reset input part configured to generate a reset signal by operation of a user, and a power controller configured to temporarily cut off driving power of the memory module during a reset time, said reset time starting when the reset signal is generated.

3. The TV according to claim 1, wherein the access command comprises at least one of a checking command to check whether the memory card is mounted thereon, a searching command to search stored data of the memory card, a playback command to play back the stored data of the memory card mounted thereon, and a storing command to store data in the memory card.

4. A TV comprising:

a memory module, including a mounting part configured to accept a plurality of types of memory cards, and a power controller configured to temporarily cut off driving power of the memory module mounted with the memory card during a reset time, the reset time starting after a reset signal is input thereto.

5. A control method of a TV, the TV comprising a memory module having detachably mounted thereto a plurality of types of memory cards, and able to input and output stored data of the memory card, the control method comprising:

inputting an access command by a user to access a memory card;

maintaining previous playback during a predetermined delaying time after the access command is input; and operating data communication corresponding to the access command with the memory module after the predetermined delaying time is passed.

6. The control method of a TV according to claim 5, further comprising:

determining whether a reset signal has been input to the TV, and cutting off driving power of the memory module during a reset time, said reset time starting when the reset signal is input to the TV.

7. The control method of a TV according to claim 6, further comprising:

resupplying the driving power to the memory module after the reset time is passed, and accessing the stored data of the memory card corresponding to the access command after a predetermined time is passed, the predetermined time starting when the driving power is resupplied to the memory module.

* * * * *